United States Patent
Li

(10) Patent No.: US 9,888,092 B2
(45) Date of Patent: Feb. 6, 2018

(54) SYSTEM AND METHOD FOR EXECUTING THIRD PARTY MODULE WITH WEB SERVERS

(75) Inventor: Haijun Li, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 293 days.

(21) Appl. No.: 12/426,920

(22) Filed: Apr. 20, 2009

(65) Prior Publication Data

US 2009/0271505 A1 Oct. 29, 2009

Related U.S. Application Data

(60) Provisional application No. 61/048,484, filed on Apr. 28, 2008.

(51) Int. Cl.
G06F 15/177 (2006.01)
H04L 29/08 (2006.01)

(52) U.S. Cl.
CPC .............. H04L 67/34 (2013.01); H04L 67/02 (2013.01)

(58) Field of Classification Search
CPC ....................................................... H04L 29/06
USPC ................................. 709/201, 203, 220, 221
See application file for complete search history.

(56) References Cited

U.S. PATENT DOCUMENTS

| | | | |
|---|---|---|---|
| 5,828,843 A | 10/1998 | Grimm | |
| 5,870,559 A * | 2/1999 | Leshem | G06F 11/32 707/E17.116 |
| 6,128,619 A * | 10/2000 | Fogarasi et al. | |
| 6,442,749 B1 * | 8/2002 | Hirao | G06F 8/24 717/170 |
| 6,567,849 B2 | 5/2003 | Ludovici | |
| 6,845,503 B1 * | 1/2005 | Carlson et al. | 717/166 |
| 6,976,063 B1 | 12/2005 | Dharmarajan | |
| 7,062,529 B2 | 6/2006 | Deboer | |
| 7,231,377 B2 | 6/2007 | Soluk | |
| 2001/0011304 A1 * | 8/2001 | Wesinger, Jr. | G06F 17/3089 709/227 |
| 2002/0002607 A1 * | 1/2002 | Ludovici et al. | 709/223 |
| 2003/0005093 A1 | 1/2003 | Deboer | |
| 2003/0084197 A1 * | 5/2003 | Hill et al. | 709/315 |
| 2003/0154279 A1 * | 8/2003 | Aziz | 709/225 |
| 2004/0199609 A1 * | 10/2004 | Papatla | H04L 29/06 709/220 |

(Continued)

OTHER PUBLICATIONS

Wikipedia (Information Hiding, Aug. 4, 2004, Wikipedia.org, http://web.archive.org/web/20040824145553/http://en.wikipedia.org/wiki/Encapsulation_%28object-oriented_programming%29, accessed on Apr. 21, 2012).*

(Continued)

Primary Examiner — Suraj Joshi
Assistant Examiner — Sherman Lin
(74) Attorney, Agent, or Firm — Tucker Ellis LLP

(57) ABSTRACT

A computer-implemented system that can support executing a third party module with Web Servers comprises one or more web server instances, a third party module that interacts with the one or more web server instances, and an execution environment that contains a web server wrapper instance that can encapsulate a web server instance of the one or more web server instances. The web server wrapper instance is associated with a web server configuration tool that can configure the one or more web server instances based on the third party module.

20 Claims, 3 Drawing Sheets

(56) References Cited

U.S. PATENT DOCUMENTS

2005/0268238 A1 12/2005 Quang
2008/0229287 A1 9/2008 Andrews

OTHER PUBLICATIONS

"Running the Web Server Configuration Tool", http://livedocs.adobe.com/jrun/4/Installing_JRun/servconf3.htm., Nov. 27, 2008.
Rao, "IBM WebSphere Application Server Configuration", http://www.ibm.com/developerworks/ibm/library/i-xmlconfig, Nov. 27, 2008.
"Web Server Configuration for Application Isolation", http://gl.fltr.ucl.ac.be/cfdocs/htmldocs/clustering_5.html, Nov. 27, 2008.
"Configuring Apache Web Server for Single Sign-On with Likewise", Likewise, 2008, 19 pages.

\* cited by examiner

SYSTEM AND METHOD FOR EXECUTING THIRD PARTY MODULE WITH WEB SERVERS

CLAIM OF PRIORITY

This application claims the benefit of priority to U.S. Provisional patent application titled "SYSTEM AND METHOD FOR EXECUTING THIRD PARTY MODULE WITH WEB SERVERS", Application No. 61/048,484 filed Apr. 28, 2008, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of executing third party module with web servers.

BACKGROUND

Web servers are widely used in the IT industry. In a typical case, a web server can receive request from a web client or a web browser, such as a HTTP request. The web server can then serve the web client or the web browser with responses along with optional data contents such as web pages. In addition, the web servers can interact with application servers and other third party modules to provide important function features.

DETAILED DESCRIPTION

Figure 1:
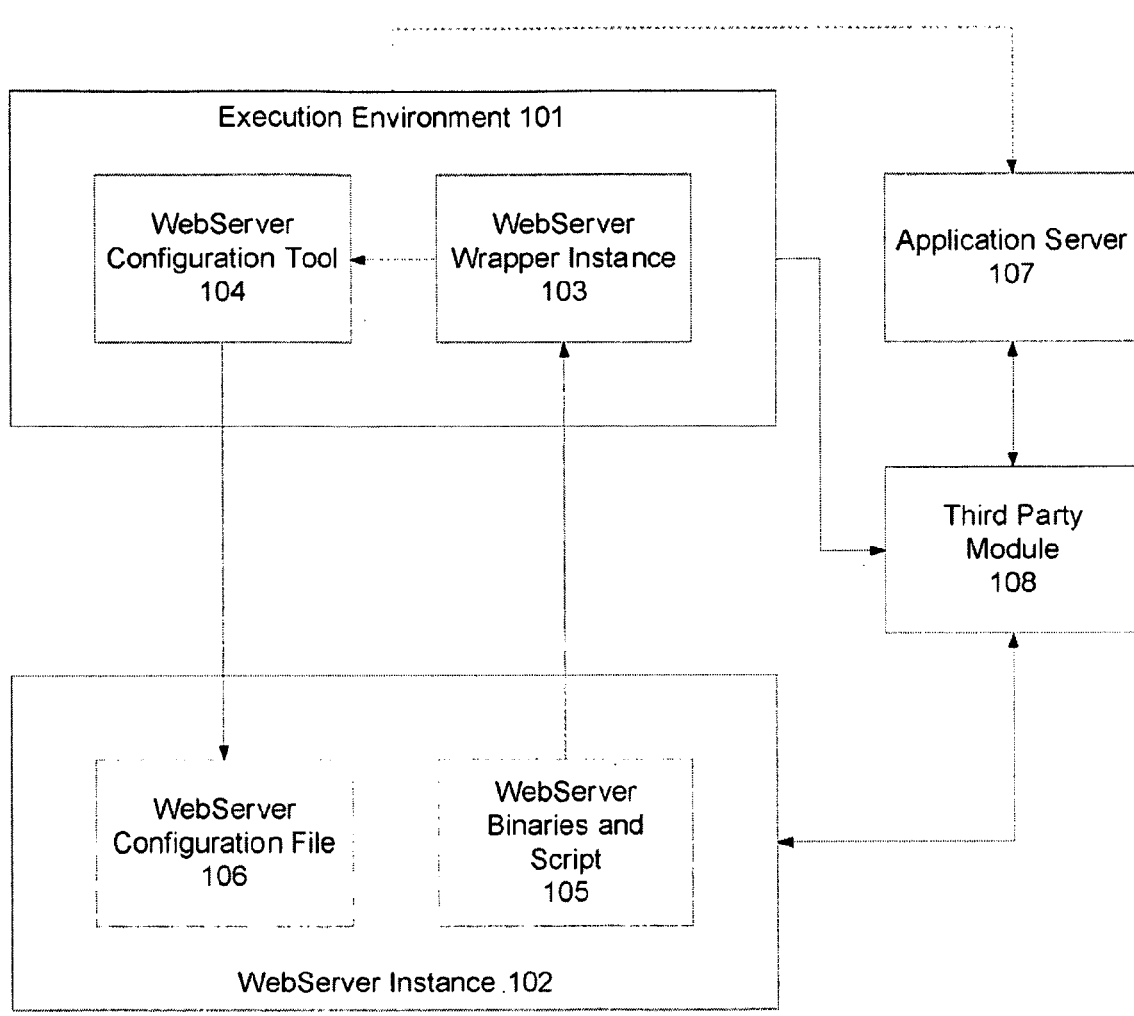
FIG. 1 is an illustration of an exemplary framework of an Execution environment in accordance with one embodiment of the present invention.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In accordance with one embodiment, third party modules and the application servers can be tested together with the web servers to insure the quality of performance.

One example of the third party module is a web server plugin for an application server, such as a web server plugin for Weblogic Server. (Weblogic Server is a product of BEA Systems, Inc). With the plugin configured on the web server, the web server can act as proxy, load balancer and failover controller of the backend application servers. However, most of the web servers available in the market now, such as Apache Http Server, Sun Java System Web Server, and Microsoft Internet Information Server (IIS), do not provide object oriented configuration Abstract Programming Interface (API). Hence, it is very difficult to execute or test web server plugin with the web servers automatically.

In order to correctly perform the testing task, one can configure the web server with the web server plugin, including changing of the configurable parameter's values of a web server and control the lifecycle of the web server. One way to achieve this end is by directly performing string replacement and directly calling external start/stop command. The following are exemplary steps one can take to perform testing of the web server plugin with the web server:

Read in a web server configuration file of web server;
Search for specific match string in the web server configuration files; and
Do string replacement and overwrite the web server configuration file.

In this case, for every new testing job, there can be a different configuration. For each new configuration, one needs to search the web server configuration files again and do the replacement. In some cases, this can result in very complex regular expression in order to find the right matching.

In accordance with an embodiment, by adopting an object oriented wrapping, the web server related testing can be made much easier and efficient. Since these web servers have different configuration files and syntax, the search logic and replacement become more and more complex. In accordance with an embodiment, by adopting an object oriented wrapping, the web server related testing can be made much easier and efficient.

In this case, the web server wrapper object provides standard interface to do configuration and control. The configuration files can also be parsed and wrapped into object which eliminates the need to the web server configuration file every time for a new testing job. The web server wrapper is an object orient encapsulation of web server. By doing the object orient encapsulation of web server, new configuration task can be added with much less work. The following are exemplary steps one can take to perform testing of the web server plugin with the web server:

Create a web server wrapper instance by passing the home dir and type.
Call specific method of the web server wrapper instance to do configuration.
Call specific lifecycle method of the web server wrapper to start/stop the web server.

FIG. 1 is an illustration of an exemplary framework of an Execution environment in accordance with one embodiment of the present invention.

In accordance with an embodiment, the system supports executing a third party module with Web Servers. As shown in FIG. 1, the system includes one or more web server instances 102; a third party module 108 that interacts with the one or more web server instances 102; and an execution environment 101 that contains a web server wrapper instance 103 that can encapsulate a web server instance of the one or more web server instances 102, wherein the web server wrapper instance 103 is associated with a web server configuration tool 104 that can configure the one or more web server instances 102 based on the third party module 108.

In some cases, each web server instances 102 can include one or more web server configuration files 106 and web server binaries and script 105. In some cases, the third party module 108 can interact with both the web server instance 102 and an application server 107. In some cases, there exists a direct mapping relationship between the web server wrapper instance 103 and the web server binaries and script 105.

In accordance with an embodiment, general web server abstraction of the web server instance 102 or the web server binaries and script 105 includes the most often used functions web servers that include loading module, changing listening port, start/stop. In one example, the abstract general web server is an interface and all web server wrappers implement the abstract general web server interface. In some cases, there can be an individual wrapper for each available individual web server.

The Apache Wrapper

In accordance with an embodiment, one example of such a web server wrapper is an Apache Wrapper for an Apache web server. In this case, the Apache Wrapper wrap the apache web server in an object oriented way.

Figure 2A:
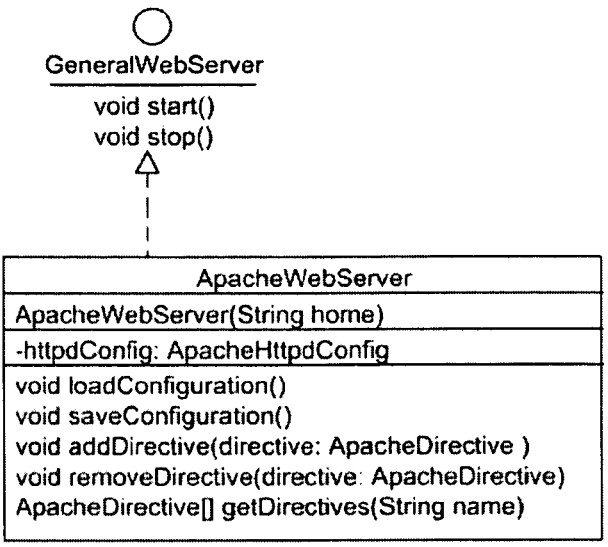
FIG. 2A is an exemplary illustration of the apache wrapper that represents the Apache web server instance in accordance with one embodiment of the invention.

FIG. 2A shows the major class for apache wrapper that represents the Apache web server instance.

The configuration files of Apache web server are "httpd.conf" and "mime.types". In one instance, the apache wrapper can parse and wrap these two files into objects. For instances, container directives are wrapped as object and the values that are associated with the directives are wrapped as attributes.

Figure 2B:
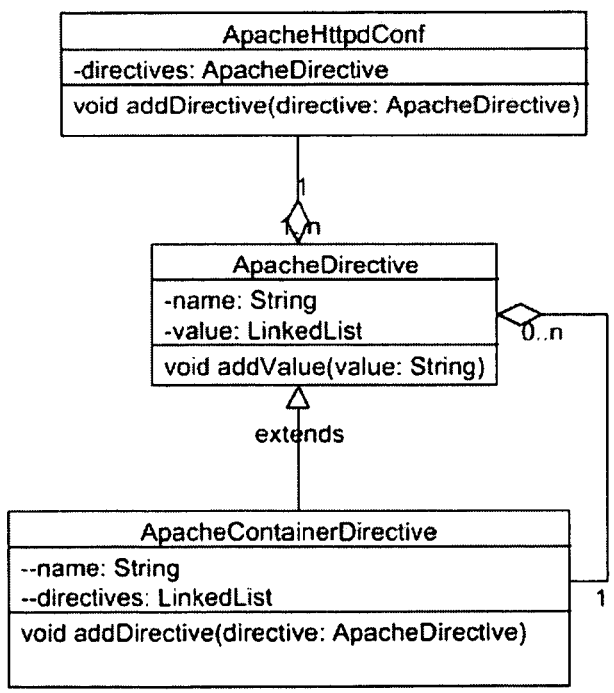
FIG. 2B is an exemplary illustration of a class diagram for apache wrapper that represents the configuration file of the Apache web server instance in accordance with one embodiment of the invention.

FIG. 2B shows the three classes are used to represent the "httpd.conf" file: ApacheHttpdConf, ApacheDirective and ApacheContainerDirective.

The following provides an example for using the Apache Wrapper to configure an Apache web server.

```
Apache2WebServer apache = new Apache2WebServer("C:/Apache");
apache.addModule("weblogic_handler", "mod_wl_20.so");
```

The corresponding "httpd.conf" configuration for an Apache web server is LoadModule weblogic_module mod_wl_20.so In this example, the input is the httpd.conf file path. After the ApacheWebServer instance was created and the loadConfiguration method is invoked, it can read the httpd.conf and build a ApacheHttpdConf object and store the object as an attribute of ApacheWebServer. In some examples, there also exists container directive that can contain other directives, such as Files and Location.

The following is another example that demonstrates how to add the below contents into the Apache web server configuration file, httpd.conf.

```
LoadModule weblogic_module mod_wl_20.so
<IfModule mod_weblogic.c>
   WebLogicCluster haili01:8110,haili01:8120
   <Location /proxy_qapath>
     SetHandler weblogic-handler
   </Location>
</IfModule>
```

The Apache Wrapper can work as the following,

```
Apache2WebServer apache = new Apache2WebServer("C:/Apache");
apache.loadConfiguration( );
//   loadModule
   ApacheDirective loadModule = new
   ApacheDirective("loadModule");
   loadModule.addValue("weblogic_module");
   loadModule.addValue("mod_wl_20.so");
   apache.addDirective(loadModule);
//   IfModule
   ApacheContainerDirective ifModule = new
   ApacheContainerDirective("IfModule");
   directive.addValue("mod_weblogic.c");
//   WebLogicCluster
   ApacheDirective directive = new
   ApacheDirective("WebLogicCluster");
   directive.addValue("haili01:8110,haili01:8120");
   ifModule.addDirective(directive);
//   Location
   ApacheContainerDirective location = new
   ApacheContainerDirective("Location");
   location.addValue("/proxy_qapath");
   ifModule.addDirective(location);
//   SetHandler
directive = new ApacheDirective("SetHandler");
directive.addValue("weblogic-handler");
location.addDirective(directive);
apache.saveConfiguration( );
```

In addition, there can also be a MimeType class that represents an entry of the mime.types file. The MimeType class can be a very simple class which has only two attributes, one is the extension and the other is the type string.

The SunJS Wrapper

In accordance with an embodiment, another example of web server wrapper is a SunJS Wrapper. Again, the SunJS Wrapper wrap the SUN JS web server in an object oriented way. All the configuration files can be parsed and wrapped into objects.

Figure 3A:
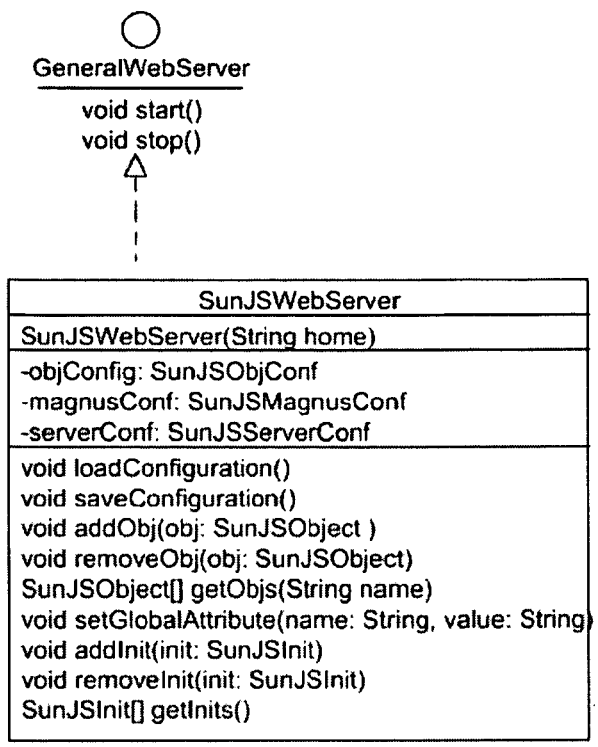
FIG. 3A is an exemplary illustration of the SunJS wrapper that represents the SUN JS web server instance in accordance with one embodiment of the invention.

FIG. 3A shows the major class for apache wrapper that represents the SUN JS web server instance.

The configuration files of SUN JS web server are "obj.conf", "magnus.conf" and "server.xml". The main task of apache wrapper is parsing and wrapping these two files. All the configuration files can be parsed and wrapped into objects. For instances, container directives are wrapped as object and others as attributes.

Figure 3B:
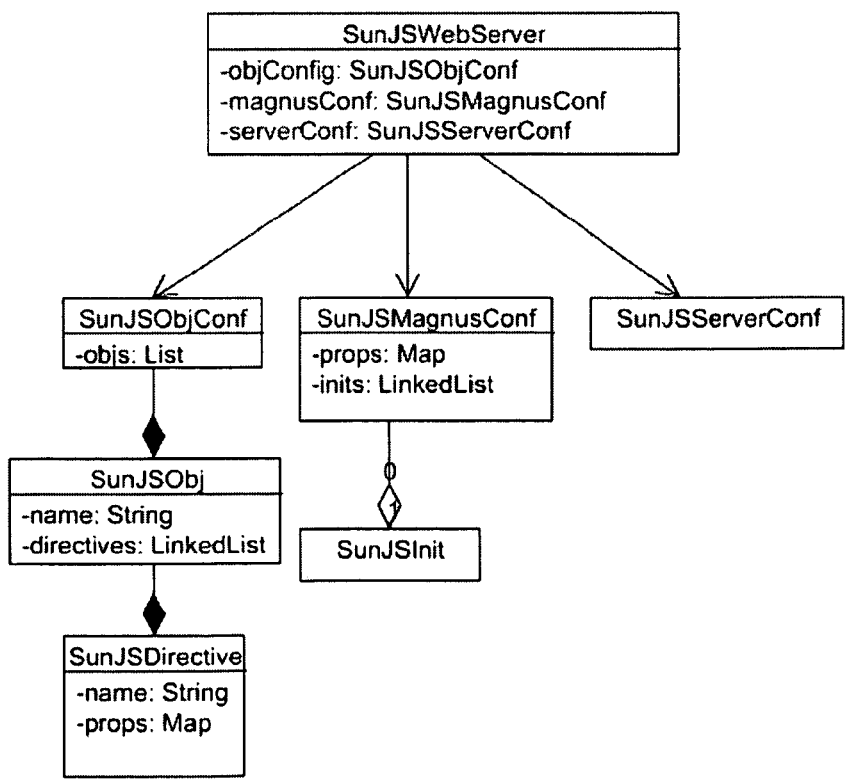
FIG. 3B is an exemplary illustration of a class diagram for SunJS wrapper that represents the configuration file of the SUN JS web server instance in accordance with one embodiment of the invention.

FIG. 3B shows the three classes are used to represent the "httpd.conf" file: SunJSObjConf, SunJSMagnusConf, SunJSServerConf, SunJSObject and SunJSInit.

The following provides an example for using the SunJS JS Wrapper to configure an SUN JS web server.

```
SunJS6WebServer sunjs = new
SunJS6WebServer("C:/Sun/WebServer6.1/https-haili01");
   Map map = new HashMap( );
   map.set("fn", "load-module");
   map.set("funcs", "wl-proxy,wl-init");
   map.set("shlib", "C:/proxy61.dll");
   sunjs.AddInit(new SunJSInit(map));
   map = new HashMap( );
   map.set("fn", "wl-init");
   sunjs.AddInit(new SunJSInit(map));
```

The corresponding "magnus.conf" configuration for a SunJS web server is

```
Init fn="load-modules" funcs="wl-proxy,wl-init" shlib="C:/proxy61.dll"
Init fn="wl-init"
```

Again, there can also be a MimeType class for the SunJS Wrapper that represents an entry of the mime.types file. The MimeType class can be a very simple class which has only two attributes, one is the extension and the other is the type string.

In accordance with an embodiment, yet another example of web server wrapper is a IIS Wrapper. Again, the IIS Wrapper wrap the IIS web server in an object oriented way. All the configuration files can be parsed and wrapped into objects. The following provides an example for using the IIS Wrapper to configure an IIS web server.

```
IIS6WebServer iis = new IIS6WebServer( );
iis.getScriptMapping( ).set("*.jsp", "C:/iisproxy.dll");
```

The corresponding WSH script for the IIS web server can be,

```
Set IIsWebServerObj = GetObject("IIS://localhost/W3SVC/1")
maps = IIsWebVDirObj.ScriptMaps
maps.Put "*.jsp", "C:/iisproxy.dll"
IIsWebVDirObj.Put "ScriptMaps", maps
```

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A computer-implemented system configured to support executing one or more associated plugin modules on a web server for testing performance of the one or more associated plugin modules selectively executed on the web server, the computer-implemented system comprising:
   one or more microprocessors;
   one or more computer memories operatively coupled to the one or more microprocessors;
   first and second web server instances, executable on the one or more microprocessors, wherein the first web server instance includes a first plurality of configuration files and a first set of binaries and scripts, and wherein the second web server instance includes a second plurality of configuration files and a second set of binaries and scripts; and
   an execution environment, executable on the one or more microprocessors, that includes:
      a web server configuration tool to configure the first and second web server instances; and
      first and second web server wrappers, wherein each web server wrapper respectively wraps a respective web server instance of the first and second web server instances by:
         parsing the first plurality of configuration files by identifying first directives and first values associated with the first directives;
         wrapping the first values as first attributes;
         wrapping the first directives, the first plurality of configuration files, and the first set of binaries and scripts associated with the first web server instance into one or more first objects that can be accessed via an object oriented abstract programming interface for executing the one or more associated plugin modules on the web server;
         parsing the second plurality of configuration files by identifying second directives and second values associated with the second directives;
         wrapping the second values as second attributes; and
         wrapping the second directives, the second plurality of configuration files, and the second set of binaries and scripts associated with the second web server instance into one or more second objects that can be accessed via the object oriented abstract programming interface for executing the one or more associated plugin modules on the web server;

wherein each web server instance of the first and second web server instances is configured to employ an associated web server plugin module executed via the web server instance by:

selecting a web server wrapper, corresponding to the web server instance, from the one or more web server wrappers, creating a web server wrapper instance that wraps the corresponding web server instance by passing a home directory of the corresponding web server instance as a parameter, invoking, via the web server configuration tool, methods of said web server wrapper instance to configure said web server instance to utilize the associated web server plugin module, and invoking a life cycle method of the web server wrapper instance to control said web server instance and execution of the associated web server plugin module.

2. The system according to claim 1, wherein the associated web server plugin interacts with a back end application server.

3. The system according to claim 1, wherein:
the first and second web server instances are selected from the group consisting of an Apache Http Server instance, a Sun JAVA System (JS) Web Server instance, and a Microsoft Internet Information Server (IIS) instance;
the first and second plurality of configuration files are selected from the group consisting of httpd.conf files, mime.types files, obj.conf files, magnus.conf files, and server.xml files; and
the first and second web server wrappers are selected from the group consisting of an Apache Wrapper, a Sun JS Wrapper, and a Microsoft IIS Wrapper.

4. The system according to claim 1, wherein the web server configuration tool is configured to test the associated web server plugin module by creating a new web server configuration file.

5. The system according to claim 1, wherein said first and second web server wrappers are configured to test a web server plugin module using different test configurations.

6. The system according to claim 1, wherein each of the first and second web server wrappers implement an interface that provides functions for:
loading a web server module,
changing a web server listening port, and
starting and stopping a web server execution.

7. The system according to claim 1, wherein:
the first and second web server instances are selected from the group consisting of an Apache Http Server instance, a Sun JAVA System (JS) Web Server instance, and a Microsoft Internet Information Server (IIS) instance;
the first and second plurality of configuration files are selected from the group consisting of httpd.conf files, mime.types files, obj.conf files, magnus.conf files, and server.xml files;
the first and second web server wrappers are selected from the group consisting of an Apache Wrapper, a Sun JS Wrapper, and a Microsoft IIS Wrapper;
the web server configuration tool is configured to test the associated web server plugin module by creating a new web server configuration file;

the first and second web server wrappers are configured to test a web server plugin module using different test configurations;

each of the first and second web server wrappers implement an interface that provides functions of:
loading a web server module,
changing a web server listening port, and
starting and stopping a web server execution; and
the system is configured to test the associated web server plugin module with a selected web server instance by steps comprising:
wrapping the selected web server instance and the associated web server plugin module in a selected web server wrapper; and
executing the selected web server instance with the associated web server plugin module wrapped by the selected web server wrapper.

8. The system of claim 1 wherein:
the first and second web server instances comprise a plurality of web server instances, the plurality of web server instances including an Apache Http Server instance, a Sun JAVA System (JS) Web Server instance, and a Microsoft Internet Information Server (IIS) instance;
the first and second web server wrappers comprise a plurality of web server wrappers, the plurality of web server wrappers including an Apache Wrapper, a Sun JS Wrapper, and a Microsoft IIS Wrapper; and
each web server wrapper of the first and second plurality of web server wrappers selectively wraps a different type of web server instance of the plurality of web server instances therein, by parsing and wrapping a plurality of configuration files, binaries and scripts associated with the different web server instance into objects and representing the plurality of configuration files as one or more object oriented classes that can be accessed via the object oriented abstract programming interface (API) for executing the one or more associated plugin modules; and
wherein the plurality of configuration files include httpd.conf files, mime.types files, obj.conf files, magnus.conf files, and server.xml files.

9. A method to support executing one or more associated plugin modules on a web server, the method comprising:
providing first and second web server instances selectively executing on one or more microprocessors, wherein the first web server instance includes a first plurality of configuration files and a first set of binaries and scripts, and wherein the second web server instance includes a second plurality of configuration files and a second set of binaries and scripts;
providing first and second web server wrappers, wherein each web server wrapper respectively wraps a respective web server instance of the first and second web server instances by:
parsing the first plurality of configuration files by identifying first directives and first values associated with the first directives;
wrapping the first values as first attributes;
wrapping the first directives, the first plurality of configuration files, and the first set of binaries and scripts associated with the first web server instance into one or more first objects that can be accessed via an object oriented abstract programming interface for executing the one or more associated plugin modules on the web server;

parsing the second plurality of configuration files by identifying second directives and second values associated with the second directives;
wrapping the second values as second attributes; and
wrapping the second directives, the second plurality of configuration files, and the second set of binaries and scripts associated with the second web server instance into one or more second objects that can be accessed via the object oriented abstract programming interface for executing the one or more associated plugin modules on the web server; and
configuring each web server instance of the first and second web server instances to employ an associated web server plugin module executed via the web server instance by:
selecting a web server wrapper, corresponding to the web server instance, from the one or more web server wrappers,
creating a web server wrapper instance that wraps the corresponding web server instance by passing a home directory of the corresponding web server instance as a parameter,
invoking methods of said web server wrapper instance to configure said web server instance to utilize the associated web server plugin module, and
invoking a life cycle method of the web server wrapper instance to control said web server instance and execution of the associated web server plugin module.

10. The method according to claim 9, wherein the associated web server plugin module interacts with a back end application server.

11. The method according to claim 9, wherein:
the first and second web server instances are selected from the group consisting of an Apache Http Server instance, a Sun JAVA System (JS) Web Server instance, and a Microsoft Internet Information Server (IIS) instance;
the first and second plurality of configuration files are selected from the group consisting of httpd.conf files, mime.types files, obj.conf files, magnus.conf files, and server.xml files; and
the first and second web server wrappers are selected from the group consisting of an Apache Wrapper, a Sun JS Wrapper, and a Microsoft IIS Wrapper.

12. The method of claim 9, wherein the web server configuration tool is configured to test the web server plugin module by creating a new web server configuration file.

13. The method of claim 9, wherein said first and second web server wrappers are configured to test a web server plugin module using different test configurations.

14. The method of claim 9, wherein each of the first and second web server wrappers implement an interface that provides functions for:
loading a web server module,
changing a web server listening port, and
starting and stopping a web server execution.

15. The method of claim 9:
wherein the first and second web server instances are selected from the group consisting of an Apache Http Server instance, a Sun JAVA System (JS) Web Server instance, and a Microsoft Internet Information Server (IIS) instance;
wherein the first and second plurality of configuration files are selected are selected from the group consisting of httpd.conf files, mime.types files, obj.conf files, magnus.conf files, and server.xml files;

wherein the first and second web server wrappers are selected from the group consisting of an Apache Wrapper, a Sun JS Wrapper, and a Microsoft IIS Wrapper;
wherein the web server configuration tool is configured to test the associated web server plugin module by creating a new web server configuration file;
wherein the first and second web server wrappers are configured to test a web server plugin module using different test configurations;
wherein each of the web server wrappers implement an interface that provides functions of:
loading a web server module,
changing a web server listening port, and
starting and stopping a web server execution; and
further comprising testing the associated web server plugin module with a selected web server instance by:
wrapping the selected web server instance and the associated web server plugin module in a selected web server wrapper; and
executing the selected web server instance with the associated web server plugin module wrapped by the selected web server wrapper.

16. A non-transitory machine readable medium having instructions stored thereon that when executed cause a system to perform steps supporting execution of one or more associated plugin modules on a web server, the steps comprising:
providing first and second web server instances selectively executing on one or more microprocessors, wherein the first web server instance includes a first plurality of configuration files and a first set of binaries and scripts, and wherein the second web server instance includes a second plurality of configuration files and a second set of binaries and scripts;
providing first and second web server wrappers, wherein each web server wrapper respectively wraps a respective web server instance of the first and second web server instances by:
parsing the first plurality of configuration files by identifying first directives and first values associated with the first directives;
wrapping the first values as first attributes;
wrapping the first directives, the first plurality of configuration files, and the first set of binaries and scripts associated with the first web server instance into one or more first objects that can be accessed via an object oriented abstract programming interface for executing the one or more associated plugin modules on the web server;
parsing the second plurality of configuration files by identifying second directives and second values associated with the second directives;
wrapping the second values as second attributes; and
wrapping the second directives, the second plurality of configuration files, and the second set of binaries and scripts associated with the second web server instance into one or more second objects that can be accessed via the object oriented abstract programming interface for executing the one or more associated plugin modules on the web server; and
configuring each web server instance of the first and second web server instances to employ an associated web server plugin module executed via the web server instance by:
selecting a web server wrapper, corresponding to the web server instance, from the one or more web server wrappers, creating a web server wrapper instance that wraps the corresponding web server instance by passing a home directory of the corresponding web server instance as a parameter, invoking methods of said web server wrapper instance to configure said web server instance to utilize the associated web server plugin module, and invoking a life cycle method of the web server wrapper instance to control said web server instance and execution of the associated web server plugin module.

17. The non-transitory machine readable medium of claim 16, wherein the web server configuration tool is configured to test the web server plugin module by creating a new web server configuration file.

18. The non-transitory machine readable medium of claim 16, wherein the first and second web server wrappers are configured to test a web server plugin module using different test configurations.

19. The non-transitory machine readable medium of claim 16, wherein each of the first and second web server wrappers implement an interface that provides functions for:
    loading a web server module,
    changing a web server listening port, and
    starting and stopping a web server execution.

20. The non-transitory machine readable medium of claim 16:
    wherein the first and second web server instances are selected from the group consisting of an Apache Http Server instance, a Sun JAVA System (JS) Web Server instance, and a Microsoft Internet Information Server (IIS) instance;
    wherein the first and second plurality of configuration files are selected from the group consisting of httpd.conf files, mime.types files, obj.conf files, magnus.conf files, and server.xml files;
    wherein the first and second web server wrappers are selected from the group consisting of an Apache Wrapper, a Sun JS Wrapper, and a Microsoft IIS Wrapper;
    wherein the web server configuration tool is configured to test the associated web server plugin module by creating a new web server configuration file;
    wherein the first and second web server wrappers are configured to test a web server plugin module using different test configurations;
    wherein each of the first and second web server wrappers implement an interface that provides functions of:
        loading a web server module,
        changing a web server listening port, and
        starting and stopping a web server execution; and
    further comprising instructions stored thereon that when executed cause the system to test the associated web server plugin module with a selected web server instance by steps comprising:
        wrapping the selected web server instance and the associated web server plugin module in a selected web server wrapper; and
        executing the selected web server instance with the associated web server plugin module wrapped by the selected web server wrapper.

* * * * *

UNITED STATES PATENT AND TRADEMARK OFFICE
CERTIFICATE OF CORRECTION

PATENT NO. : 9,888,092 B2
APPLICATION NO. : 12/426920
DATED : February 6, 2018
INVENTOR(S) : Li Page 1 of 1

It is certified that error appears in the above-identified patent and that said Letters Patent is hereby corrected as shown below:

In the Claims

In Column 9, Line 65, in Claim 15, delete "are selected are selected" and insert -- are selected --, therefor.

Signed and Sealed this
Fourteenth Day of August, 2018

Andrei Iancu
*Director of the United States Patent and Trademark Office*